(12) United States Patent
Wakasa

(10) Patent No.: US 8,891,118 B2
(45) Date of Patent: Nov. 18, 2014

(54) PRINTING SYSTEM, PRINTING DEVICE, AND PRINT CONTROL METHOD

(75) Inventor: Shunichi Wakasa, Chikuma (JP)

(73) Assignee: Seiko Epson Corporation, Tokyo (JP)

( * ) Notice: Subject to any disclaimer, the term of this patent is extended or adjusted under 35 U.S.C. 154(b) by 253 days.

(21) Appl. No.: 13/426,749

(22) Filed: Mar. 22, 2012

(65) Prior Publication Data

US 2012/0243007 A1   Sep. 27, 2012

(30) Foreign Application Priority Data

Mar. 22, 2011   (JP) ................................. 2011-062540

(51) Int. Cl.
  *G06F 3/12*   (2006.01)
  *G06K 15/02*  (2006.01)
  *G06K 15/00*  (2006.01)

(52) U.S. Cl.
  CPC ............ *G06F 3/1208* (2013.01); *G06F 3/1284* (2013.01); *G06K 15/1821* (2013.01); *G06F 3/1259* (2013.01); *G06F 2206/1514* (2013.01); *G06F 3/1251* (2013.01); *G06F 3/1207* (2013.01); *G06K 15/1814* (2013.01); *G06K 15/402* (2013.01)
  USPC .......................... 358/1.15; 358/1.13; 358/1.18

(58) Field of Classification Search
  CPC ..... G06F 3/1201; G06F 3/125; G06F 3/1295; G06F 3/1251; G06F 2206/1514; G06K 15/1821; G06K 15/402; G06K 15/1814
  See application file for complete search history.

(56) References Cited

FOREIGN PATENT DOCUMENTS

| JP | 61-095438 A | 5/1986 |
|---|---|---|
| JP | 08-278867 A | 10/1996 |
| JP | 09-231033 A | 9/1997 |
| JP | 2000-203124 A | 7/2000 |

*Primary Examiner* — Dov Popovici

(74) *Attorney, Agent, or Firm* — Nutter McClennen & Fish LLP

(57) ABSTRACT

The invention solves the problem of the layout of the printout being broken as a result of the host computer sending the next print data without knowing the current printing position after the printer automatically inserts a new line. In a printing system that communicates continuous print data and status information by command between a host computer and a printing device, the printing device prints while automatically inserting a new line in the continuous print data received from the host computer according to a print setting, and sends current position information as status information to the host computer. The host computer sends the next continuous print data based on the acquired current position information.

18 Claims, 4 Drawing Sheets

PRINTING SYSTEM, PRINTING DEVICE, AND PRINT CONTROL METHOD

Priority is claimed under 35 U.S.C. §119 from Japanese patent application No. JP 2011-062540 filed on Mar. 22, 2011, which is hereby incorporated by reference in its entirety.

BACKGROUND

1. Technical Field

The present invention relates to a printing system having a function for reporting the current position (line, column) in the print buffer of a printing device to a host computer, to a printing device used in this printing system, and to a print control method.

2. Related Art

When receiving (or reading) and writing print data to a print buffer for printing continuously, printing devices (printers) according to the related art automatically insert a new line in data exceeding the preset printing width (column count) of the print medium.

Printers that read and display data from a storage unit, sequentially read the data when printing, and move words exceeding the right margin to the next line are known from the literature. See, for example, Japanese Unexamined Patent Appl. Pub. JP-A-S61-95438.

When receiving and printing continuous print data from a host computer, such printers automatically insert a new line at the data exceeding the preset printing width (column count) of the print medium.

This is shown in FIG. 3.

FIG. 3 shows an example in which the printer is set to print 42 columns across the width of the print medium, and print data of 70 continuous characters is sent from the host computer.

In this example the printer automatically inserts a new line after the 42nd character (column 42) in the 70-character long print data, and the current printing position after finishing printing on the new line is line 2, column 28.

However, the current printing position (line 2, column 28) of the printer after the automatic new line is not reported to the host computer.

If the next print data is print data that continues from the previous print data when the host computer then sends the next print data, no particular problem occurs when the next print data is sent.

What happens when the next print data is graphic data, however, is described next using FIG. 4. If the printer receives graphic data from the host computer after inserting a new line at the 42nd character (column 42) of print data that continues for 70 characters as shown in FIG. 3, the data written to the print buffer of the printer (and the printed result) will be as shown in FIG. 4.

When this happens, graphic data that should be written from the beginning is recorded from some point in the middle of the line, and is therefore broken in two parts. The layout of the printout is thus detrimentally affected.

SUMMARY

A printing system, a printing device used therein, a host computer, and a print control method according to the present invention can solve the problem of the layout of the printout being broken as a result of the host computer sending the next print data without knowing the current printing position (line and column) after the printer automatically inserts a new line.

A printing system according to the invention is a printing system that communicates print data and status information by command between a host computer and a printing device, wherein: the printing device prints while automatically inserting a new line in the print data received from the host computer according to a print setting, and sends current position information denoting a start printing position to the host computer as status information; and the host computer sends the next print data based on the acquired current position information.

Preferably, the current position information is sent in response to a current position request from the host computer.

In another aspect of the invention, the current position request is sent before graphic data is sent from the host computer to the printing device.

In another aspect of the invention, the current position information sent from the printing device is the line number and column number on the current print line.

In another aspect of the invention, the current position information sent from the printing device is the first character or last character of the current print line.

In another aspect of the invention, the current position information sent from the printing device is bit coordinate data for the current print line in the print buffer to which the print data is buffered.

Another aspect of the invention is a printing device that prints while automatically inserting a new line in print data received from a host computer according to a print setting, including: a communication unit that receives a current position request from the host computer, and sends current position information denoting a start printing position to the host computer; and a current position calculator that calculates the current position information in response to a received current position request.

A host computer according to the invention is a host computer that sends print data to a printing device for printing while automatically inserting new lines based on printing device settings, the host computer having a communication unit that sends a current position request to the printing device, and based on the printing position information acquired from the printing device sends text information or graphic data.

Another aspect of the invention is a print control method including steps of: receiving continuous print data from a host computer; printing while automatically inserting a new line in the received continuous print data according to a set number of columns; receiving a current position request from the host computer, and calculating and sending current position information denoting a start printing position to the host computer; applying a new line process after receiving a new line command from the host computer; and receiving the next print data from the host computer.

Effect of the Invention

A printing system, a printing device used therein, and a print control method according to the present invention solve the problem of the layout of the printout being broken as a result of the host computer sending the next print data without knowing the current printing position (line and column) after the printer automatically inserts a new line.

Other objects and attainments together with a fuller understanding of the invention will become apparent and appreciated by referring to the following description and claims taken in conjunction with the accompanying drawings.

DESCRIPTION OF EMBODIMENTS

The configuration of a printing system according to a preferred embodiment of the present invention is described below with reference to FIG. 2.

Figure 2:
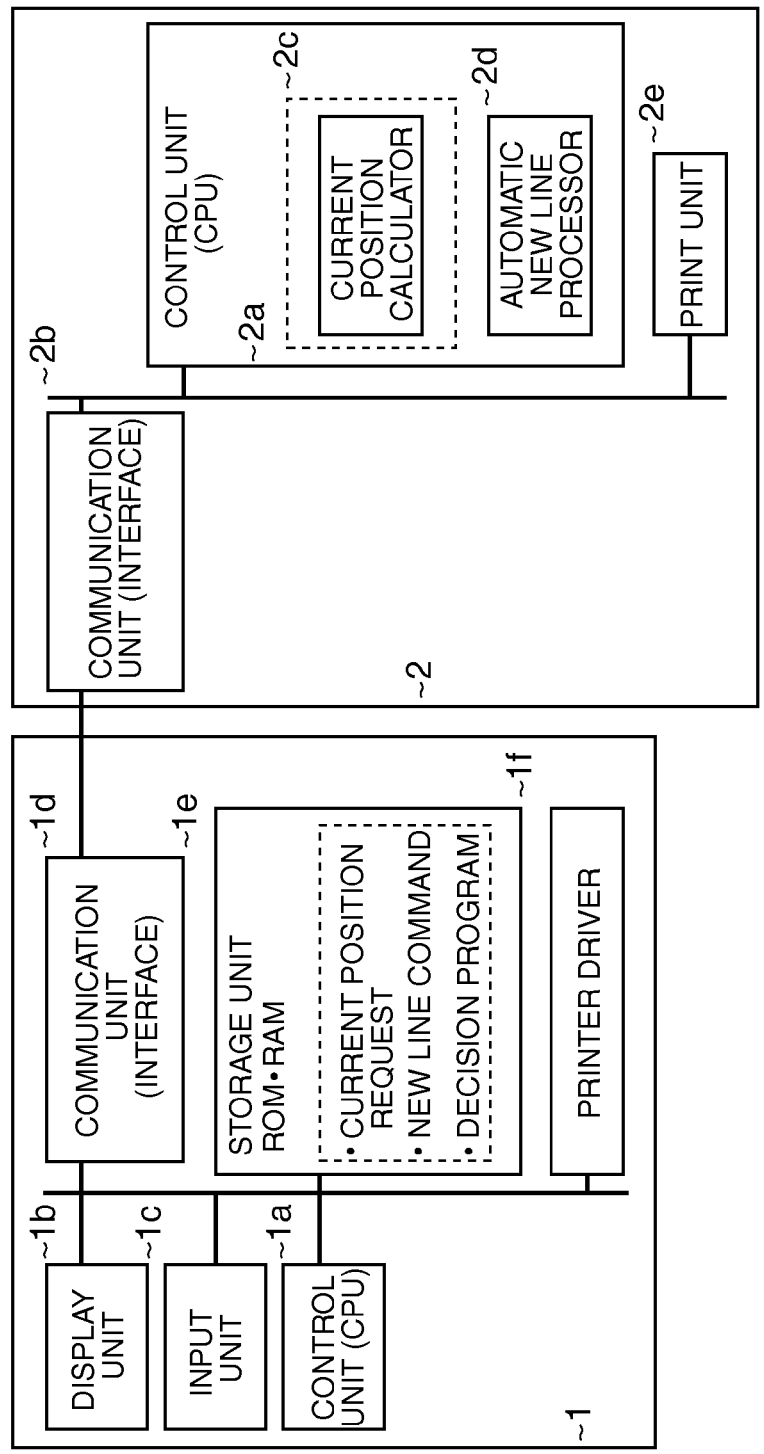
FIG. 2 is a block diagram showing the configuration of a printing system according to the invention, and shows a printing system including a host computer 1 and a printer 2.
Figure 4:
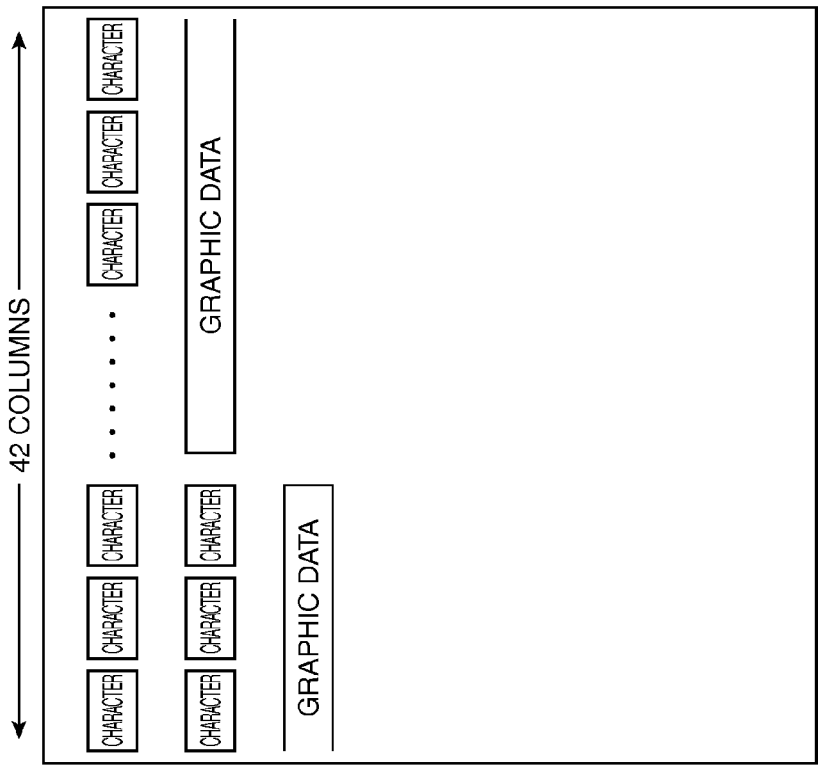
FIG. 4 shows the printout of the related art when graphic data is received after printing with an automatic new line inserted as shown in FIG. 3.

FIG. 2 shows the configuration of a printing system according to the invention. As shown in the figure, the printing system includes a host computer 1 and a printer 2 connected by a communication line, and print data and status information can be communicated by command between the host computer 1 and printer 2.

The host computer 1 has a control unit (CPU) 1a, display unit 1b, input unit 1c, communication unit (interface) 1d, storage unit 1e, and printer driver 1f.

In addition to a control program stored in ROM that enables the host computer to function normally, parts specific to the invention as denoted by the dotted line in the figure are stored in the storage unit 1e. These specific parts are a current position request, a new line command, and a decision program that determines whether or not to send the current position request or new line command to the printer 2. These are further described below.

The printer 2 has a control unit (CPU) 2a, communication unit 2b, current position calculator 2c, automatic new line processor 2d, and print unit 2e.

The part specific to a printer 2 according to the invention as denoted by the dotted line in the figure is the current position calculator 2c, which is further described below.

The method of the invention that solves the problem of the printed layout being broken by the host computer 1 sending the next print data without knowing the current printing position (line, column) after the printer of the invention automatically inserts a new line is described next with reference to the flow chart in FIG. 1.

The printer 2 first receives continuous print data (print data with 70 continuous characters in this example) sent from the host computer 1 (step S1).

Figure 3:
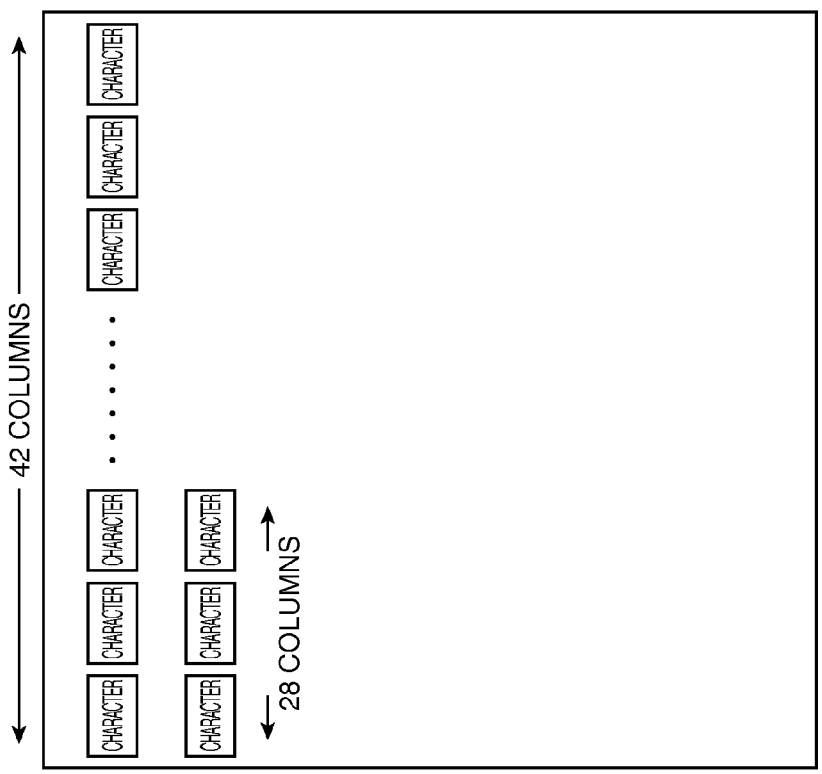
FIG. 3 shows an example of the printout when a new line is automatically inserted to print data of 70 continuous characters sent from the host computer.

The printer 2 then applies the automatic new line process of the automatic new line processor 2d in the printer based on the line count and column count settings of the printer, and prints the received print data (step S2). The resulting printout is as shown in FIG. 3 described above.

The host computer 1 then determines whether to send the current position request to the printer 2 (step S3).

If the result of step S3 is Yes, the host computer 1 sends the current position request to the printer 2 (step S4).

The decision of step S3 is made by the decision program stored in the storage unit 1e. An example of a condition in which this decision returns Yes is when the continuous print data sent next from the host computer 1 to the printer 2 is graphic data that the printer 2 preferably starts printing from the beginning of the line.

When this current position request is received, the printer 2 calculates the current position (the position where printing starts next), and sends the calculated current position to the host computer 1 as status information (step S5).

When the current position is received from the printer 2, the host computer 1 interprets the current position information and decides before sending the next continuous print data whether a new line command must be sent to the printer 2 (step S6).

If the result of step S6 is Yes, the host computer 1 sends the new line command to the printer 2, and then sends the next continuous print data (step S7).

The decision of step S6 is made by the decision program stored in the storage unit 1e. An example of a condition that results in this decision being Yes is when continuous print data is sent next from the host computer 1 to the printer 2, and the start printing position of the printer 2 is not the beginning of a line.

When a new line command is received, the printer 2 inserts a new line (step S8).

If the result of step S3 or step S6 is No, the host computer 1 sends the next continuous print data (step S10).

The printer 2 then applies the automatic new line process of the automatic new line processor 2d in the printer based on the line count and column count settings of the printer, and prints the received print data (step S9).

Figure 5:
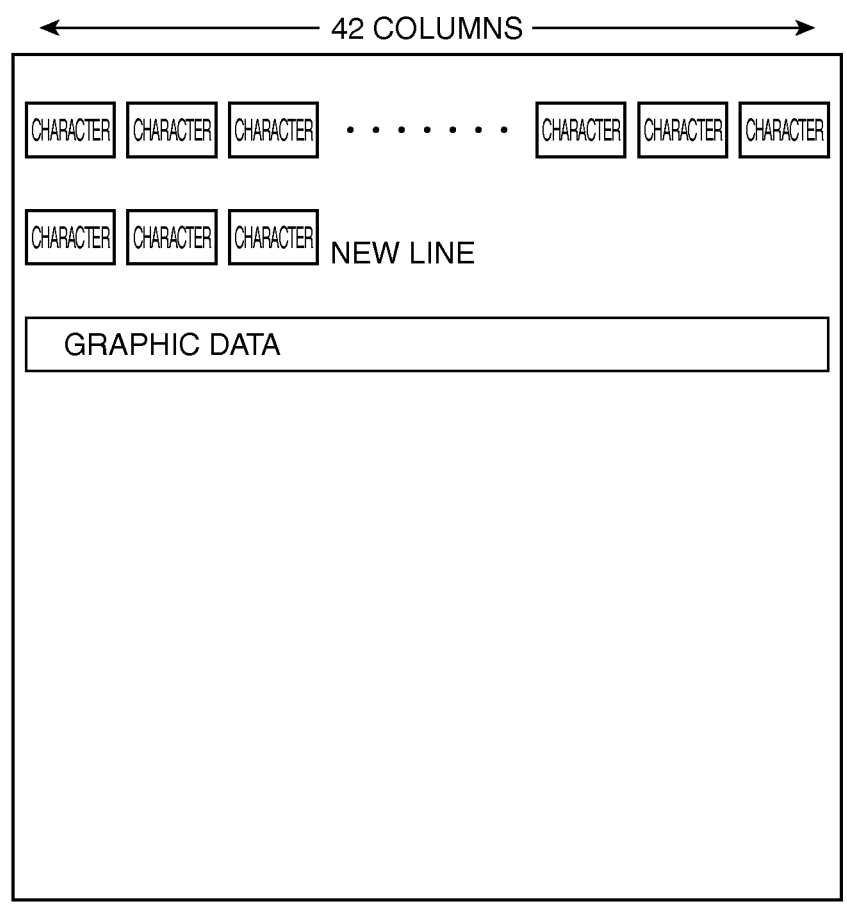
FIG. 5 shows the printout of the present invention when graphic data is received after printing with an automatic new line inserted as shown in FIG. 3.

The printout resulting from performing step S7 and step S8 is shown in FIG. 5.

As shown in FIG. 5, the line changes, the graphic data is printed from the beginning of the next line, and the problem of the layout breaking is solved.

Figure 1:
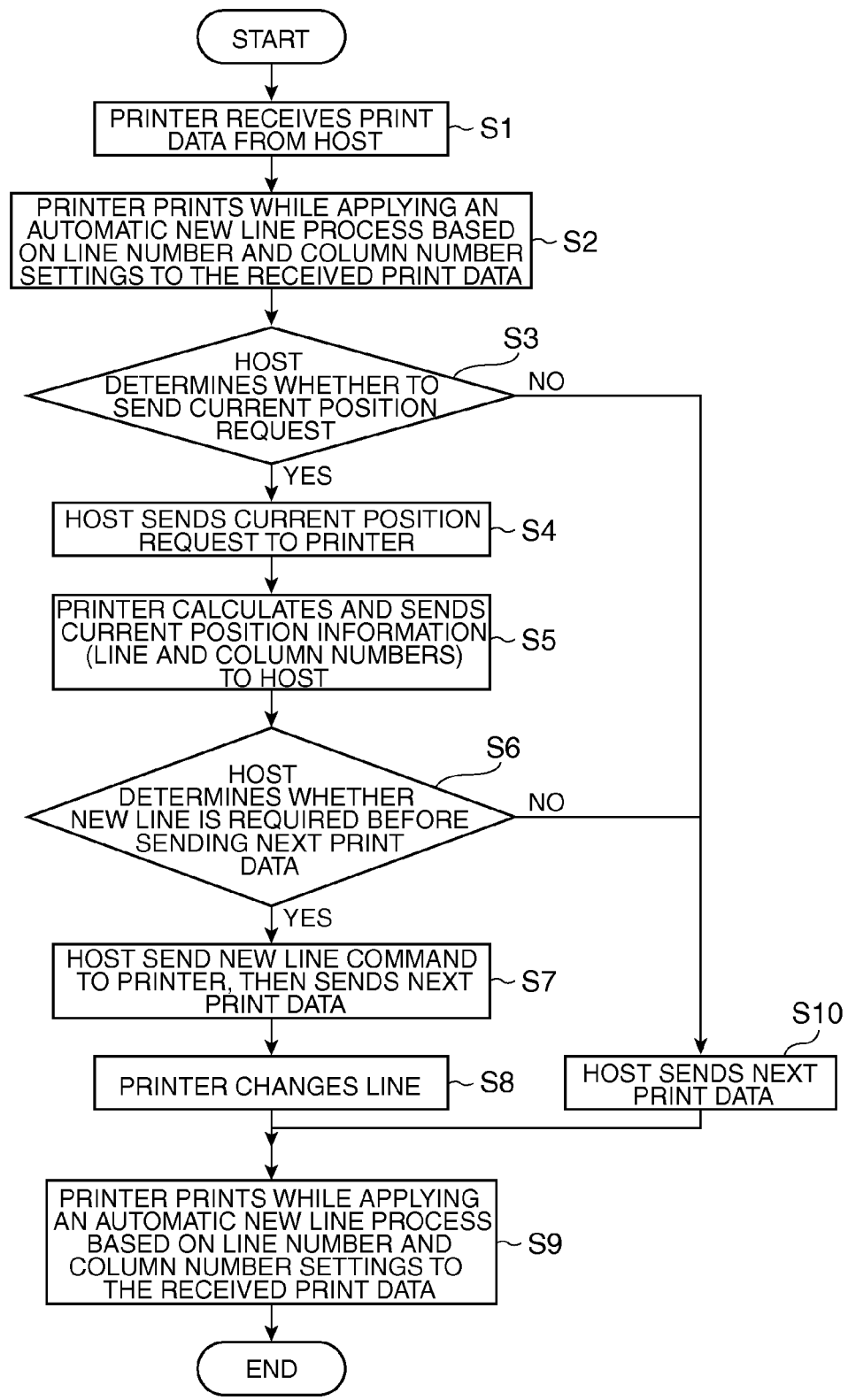
FIG. 1 is a flow chart showing steps in the process according to the invention.

Note that the host computer 1 determines whether or not to send a current position request to the printer 2 in the flow chart shown in FIG. 1, but step S3 and step S4 in the flow chart in FIG. 1 can be omitted if the printer 2 is configured to send the current position information every time after printing continuous print data.

In addition, the current position is expressed by the column number and line number of the current print line in step S5 in the flow chart in FIG. 1, but the current position could be expressed using the bit coordinates in the print buffer corresponding to the current print line.

In addition, the current position is expressed by the column number and line number of the current print line in step S5 in the flow chart in FIG. 1, but the current position could be expressed by the first character or last character of the current print line.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A printing system that communicates print data and status information by command between a host computer and a printing device, wherein:

the printing device
   prints while automatically inserting a new line in print data received from the host computer according to a print setting, and
   sends current position information denoting a start printing position to the host computer as status information; and the host computer
   sends next print data, which is print data that follows the print data the printing device received from the host computer, based on the current position information, and determines based on the current position information whether a new line command must be sent to the printing device before the host computer sends the next print data, and sends the new line command to the printing device before sending the next print data when the host computer determines that the new line command must be sent.

2. The printing system described in claim 1, wherein:
the current position information is sent in response to a current position request from the host computer.

3. The printing system described in claim 2, wherein:
the current position request is sent before graphic data is sent from the host computer to the printing device.

4. The printing system described in claim 1, wherein:
the current position information sent from the printing device is a line number and a column number on a current print line.

5. The printing system described in claim 1, wherein:
the current position information sent from the printing device is a first character or a last character of a current print line.

6. The printing system described in claim 1, wherein:
the current position information sent from the printing device is bit coordinate data for a current print line in a print buffer to which the print data is buffered.

7. The printing system described in claim 2, wherein:
the host computer sends the current position request to the printing device when the next print data is graphic data; and
the host computer sends the next print data to the printing device but does not send the current position request to the printing device when the next print data is not graphic data.

8. The printing system described in claim 1, wherein:
the host computer determines that the new line command must be sent based on whether the start printing position denoted by the current position information is at a start or an end of a line or is between the start and the end of the line;
the new line command is sent when the start printing position denoted by the current position information is between the start and the end of the line; and
the new line command is not sent when the start printing position denoted by the current position information is at the start or the end of the line.

9. The printing system described in claim 8, wherein;
the host computer determining that the new line command must be sent is also based on whether or not the next print data is graphic data;
the new line command is sent when the next print data is graphic data; and
the new line command is not sent when the next print data is not graphic data.

10. A printing device that prints while automatically inserting a new line in print data received from a host computer according to a print setting, comprising:
a communication unit that receives a current position request from the host computer when next print data, which is print data that follows the print data received from the host computer, is graphic data, does not receive the current position request when the next print data is not graphic data, and sends current position information demoting a start printing position to the host computer in response to the current position request; and a current position calculator that calculates the current position information in response to the current position request.

11. The printing device described in claim 10, wherein:
the current position information is a line number and a column number on a current print line.

12. The printing device described in claim 10, wherein;
the current position information is a first character or a last character of a current print line.

13. The printing device described in claim 10, wherein;
the current position information is bit coordinate data for a current print line in a print buffer to which the print data is buffered.

14. A print control method comprising steps of:
receiving continuous print data from a host computer;
printing while automatically inserting a new line in the received continuous print data according to a set number of columns;
receiving a current position request from the host computer, and calculating and sending current position information denoting a start printing position to the host computer;
applying a new line process after receiving a new line command from the host computer; and
receiving next print data, which is print data that follows the continuous print data, from the host computer, wherein
the host computer sends the new line command to a printing device before sending the next print data to the printing device when the host computer determines that the new line command must be sent based on whether the start printing position denoted by the current position information is at a start or an end of a line or is between the start and the end of the line,
the new line command is sent when the start printing position denoted by the current position information is between the start and the end of the line, and
the new line command is not sent when the start printing position denoted by the current position information is at the start or the end of the line.

15. The print control method described in claim 14, wherein:
the current position information is a line number and a column number on a current print line.

16. The print control method described in claim 14, wherein:
the current position information is a first character or a last character of a current print line.

17. The print control method described in claim 14, wherein:
the current position information is bit coordinate data for a current print line in a print buffer to which the print data is buffered.

18. The print control method described in claim 14, wherein:
the host computer determining that the new line command must be sent is also based on whether or not the next print data is graphic data;
the new line command is sent when the next print data is graphic data; and
the new line command is not sent when the next print data is not graphic data.

* * * * *